Patented Nov. 20, 1923.

1,474,567

UNITED STATES PATENT OFFICE.

WERNER SCHULEMANN, OF VOHWINKEL, LUDWIG SCHÜTZ AND KURT MEISENBURG, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

ESTER OF SUBSTITUTED AMINO PROPYL ALCOHOL.

No Drawing.     Application filed December 1, 1922.  Serial No. 604,399.

*To all whom it may concern:*

Be it known that we, WERNER SCHULEMANN, LUDWIG SCHÜTZ, and KURT MEISENBURG, citizens of Germany, residing at Vohwinkel, Elberfeld, and Elberfeld, in the State of Prussia, Germany, have invented new and useful Improvements in Esters of Substituted Amino Propyl Alcohol, of which the following is a specification.

We have found that the hitherto unknown esters of alkylamines having most probably the following general formula:

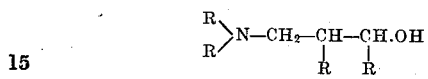

(R meaning an alkyl) have proved to be compounds possessing valuable anæsthetic properties.

The new products can be obtained by esterification of these alkamines with aromatic aminocarboxylic acids, e. g. aminobenzoic acid or aminocinnamic acid, e. g. by treatment with the para-nitrocinnamoylcholorid and reduction or by heating the alkamines with the alkylesters of para-aminobenzoic acid etc.

Our new alkamine esters are generally amorphous solid products crystallizing from ligroin, forming crystallized salts with acids which retain the valuable therapeutic properties of the esters. The salts are soluble in water, the solutions being free from any irritating action and producing local anæsthesia. They can be boiled for sterilization without undergoing decomposition. An average single dose being about 0.005 to 0.5 gram for subcutaneous use.

In order to illustrate our new process more fully the following example is given, the parts being by weight:—131 parts of alpha-methyl-beta-methyl-gamma-dimethylamino propyl alcohol having most probably the following general formula:

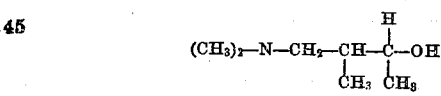

are mixed with 500 parts of benzene and to the cooled solution a cold solution of 186 parts of para-nitro-benzoylchlorid in benzene is added. The mixture is then heated for two hours on the water-bath, water is added and the benzene is separated from the aqueous solution. By the addition of a sodium carbonate solution the para-nitrobenzoic acid ester of alpha-methyl-beta-methyl-gamma-dimethylamino propyl alcohol separates.

For reduction one part of it is dissolved in three parts of concentrated hydrochloric acid and to the solution heated to 50-60° C. one part of tin is added. During the reduction the temperature is kept at 60° C. The solution is freed from tin by means of $SH_2$ and from the filtered liquid the aminobase is separated by the addition of carbonate of potassium. It is an oil solidifying after some time. It melts at 81-82° C. and forms a crystallized soluble salt with hydrochloric acid. The optically inactive product (racemic form) has two asymmetric carbon atoms. It can be resolved into its optically inactive isomers by a fractional crystallization of the base from ligroin or its salts from alcohol. The hydrochlorid of one of these products crystallizes in the shape of long needles melting at 216-217° C., the other forms crystals melting at 178° C.

Others of the above mentioned esters can be produced in an analogous way, e. g. the para-aminobenzoic acid ester of alpha-ethyl-beta - methyl - gamma - diethyl-amino propyl alcohol melting point of the hydrochlorid of the racemic form 167° C.; the para-aminobenzoic acid ester of alpha-ethyl-beta-ethyl-gamma-diethyl-amino propyl alcohol melting point of the hydrochlorid of the racemic form 146° C.; the para-aminobenzoic acid ester of alpha-ethyl-beta-methyl-gamma-diethylamino propyl alcohol melting point of the hydrochlorid of the racemic form 178° C.

We claim:

1. The herein described new esters of alkamines having most probably the following general formula:

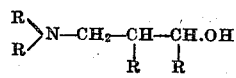

(R meaning an alkyl), with an aromatic amino carboxylic acid, which aminoesters have anæsthetic properties; being generally amorphous solid products crystallizing from ligroin, forming crystallized salts with acids which retain the valuable therapeutic properties of the esters, these salts being soluble in water and are free from any irritating action, substantially as described.

2. The herein described new para-aminobenzoic acid ester of alpha-methyl-beta-methyl-gamma-dimethlamino propyl alcohol showing anæsthetic properties having most probably the following formula:

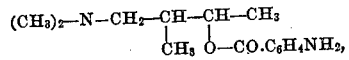

the racemic form melting at from 81–82° C., forming crystallized soluble salts with hydrochloric acid which retain the valuable therapeutic properties of the free aminobase; the racemic form of the base and of its salts being resolved into its optically inactive isomers by a fractional crystallization from alcohol, substantially as described.

In testimony whereof we have hereunto set our hands.

WERNER SCHULEMANN.
LUDWIG SCHÜTZ.
KURT MEISENBURG.